(12) United States Patent
Stanfield

(10) Patent No.: US 6,641,155 B2
(45) Date of Patent: Nov. 4, 2003

(54) SUSPENSION CONTROL SYSTEM AND A METHOD OF OPERATION THEREFOR

(75) Inventor: Glenn H. Stanfield, Plainfield, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/915,642

(22) Filed: Jul. 26, 2001

(65) Prior Publication Data

US 2003/0020252 A1 Jan. 30, 2003

(51) Int. Cl.$^7$ ............... B60G 11/26; B60G 17/005
(52) U.S. Cl. .................................. 280/124.159
(58) Field of Search ............... 280/754, 755, 280/124.159, 124.158, 124.157, 6.157, 6.159

(56) References Cited

U.S. PATENT DOCUMENTS

| | | | |
|---|---|---|---|
| 3,782,755 A | | 1/1974 | Spichala |
| 3,953,040 A | * | 4/1976 | Unruh et al. ............ 280/6.158 |
| 4,145,073 A | * | 3/1979 | McLuckie et al. ..... 280/124.157 |
| 4,245,854 A | | 1/1981 | Curnutt |
| 4,504,081 A | | 3/1985 | Shimizu et al. |
| 4,589,675 A | | 5/1986 | Braun et al. |
| 4,655,440 A | | 4/1987 | Eckert |
| 4,659,104 A | | 4/1987 | Tanaka et al. |
| 4,705,295 A | * | 11/1987 | Fought ........................ 280/754 |
| 4,799,707 A | | 1/1989 | Buma et al. |
| 4,890,859 A | | 1/1990 | Drott |
| 4,971,353 A | | 11/1990 | Buma et al. |
| 5,062,659 A | | 11/1991 | Edahiro et al. |
| 5,449,194 A | * | 9/1995 | Wernimont et al. ......... 280/754 |
| 5,452,919 A | | 9/1995 | Hoyle et al. |
| 6,145,859 A | | 11/2000 | Altherr et al. |

FOREIGN PATENT DOCUMENTS

| | | | |
|---|---|---|---|
| DE | 42 42 448 C1 | * | 3/1994 |
| DE | 4242448 C1 | | 5/1994 |

* cited by examiner

Primary Examiner—Peter C. English
(74) Attorney, Agent, or Firm—Steve M Hanley; D James Barnes

(57) ABSTRACT

A suspension control system includes a load support member, a base member and a moveable element attached to the base member and the load support member. The load support member is moveable relative to the base member through the moveable element. An accumulator is in fluid communication with the moveable element. A locking circuit is disposed between the moveable element and the accumulator and is selectively activatable to sustain the load support member in a fixed position. The locking circuit includes a pressurized fluid supply and a flow blocking mechanism operably engaged with the pressurized fluid supply. The flow blocking mechanism is urged to block fluid communication between the moveable element and the accumulator when the locking circuit is selectively activated.

21 Claims, 3 Drawing Sheets

SUSPENSION CONTROL SYSTEM AND A METHOD OF OPERATION THEREFOR

TECHNICAL FIELD

This invention relates generally to a ride control system for a machine and more particularly to a control system for selectively locking a suspension system.

BACKGROUND

In known ride control systems for machines, cushioning of the ride is controlled by suspension systems employing a damper between the load bearing frame and the ground engaging wheels to absorb the effects of impact as the machine engages the ground. Machines are often provided with attachments such as a bucket, for example, to perform work on external concerns. In preparation for performing work with the attachment, an operator maneuvers the attachment and thereafter performs the desired operation. However, controllability of the attachment is limited by the suspension system which remains reactive when the operator is attempting to position the attachment. For example, the machine may lurch or settle as the attachment is maneuvered resulting in an inefficient performance of the operation or a failed attempt to perform the desired operation.

It is known to provide suspension override capabilities to stabilize a rebounding wheel, however this instrumentation is typically complicated and consequently expensive to implement. Additionally, this system requires a significant number of fluid transfer components, and accordingly, system leaks are a concern. Even a slight leak may render the system inoperable.

For example, U.S. Pat. No. 4,971,353 issued to Buma et al. discloses an accumulator in fluid communication with an actuator through a shut-off valve and a flow resistance. An auxiliary accumulator is connected directly to the actuator to serve as an additional spring in the event a wheel experiences a significant and rapid rebound. The suspension control system slows movement of a piston rod of the actuator by controlling a fluid condition at the site of the rod end, while at the same time, the head end of the actuator is in fluid communication with the auxiliary accumulator through a restriction. Since the actuator remains in continuous fluid communication with the accumulator, fluid transfer between the actuator and accumulator is not effectively blocked.

It is desirable to provide a suspension control system of simple construct to improve the controllability of the attachment. Further, a suspension control system configured to selectively lock-out the suspension system without a significant addition of fluid transfer components which may otherwise leak and render inoperable the lock-out system is desirable.

The present invention is directed to overcoming one or more of the problems as set forth above.

SUMMARY OF THE INVENTION

In one aspect of the present invention a suspension control system is provided and adapted for use in a fluid system of a machine and includes a locking circuit disposed between a moveable element and an accumulator which is selectively activatable to sustain a load support member in a fixed position relative to a base member. The suspension control system includes the load support member, the base member and a moveable element attached to the base member and the load support member. The load support member is moveable relative to the base member through the moveable element. An accumulator is in fluid communication with the moveable element and a locking circuit is disposed between the moveable element and the accumulator and is selectively activatable to sustain the load support member in a fixed position. The locking circuit includes a pressurized fluid supply and a flow blocking mechanism operably engaged with the pressurized fluid supply. The flow blocking mechanism is urged to block fluid communication between the moveable element and the accumulator when the locking circuit is selectively activated.

In another aspect of the invention a method for stabilizing an implement of a machine subject to an external influence is provided and includes the steps of accumulating pressurized fluid provided by an accumulator in fluid communication with a moveable suspension member in response to the external influence exerted on the machine; directing the pressurized fluid to a lock-out circuit disposed between the accumulator and the moveable suspension member; and causing the accumulator and the moveable element to be fluidly disconnected, wherein cushioning effects of the accumulator are disabled.

DETAILED DESCRIPTION

Figure 1:
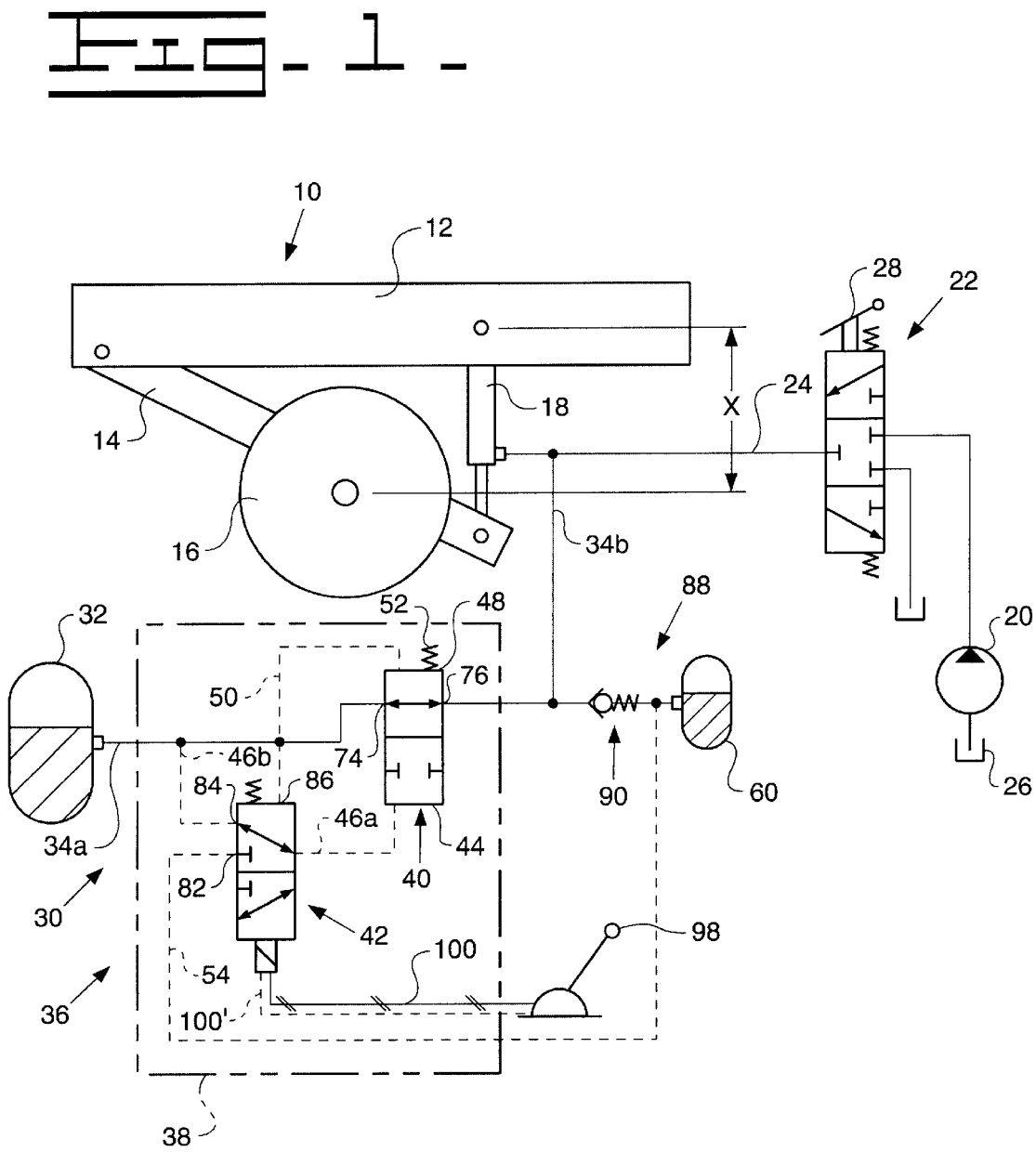
FIG. 1 is a schematic representation of a machine including a first embodiment of a suspension control system according to the present invention.

Referring to FIG. 1, machine 10 includes load support member 12 attached to moveable base member 14. Load support member 12 may be a load bearing frame member and base member 14 may be a suspension member which supports a wheel 16 of a ground-engaging machine, for example. Load support member 12 is connected to base member 14 through moveable element 18 such as an actuator or suspension cylinder, for example.

Moveable element 18 is hydraulically connected to pump 20 through conduit 24 and ride height adjustment valve 22 is connected to conduit 24. Valve 22 is provided to allow an operator to select height X for machine 10 through height adjustment lever 28. In a conventional manner, pump 20 draws system fluid from tank 26 and urges fluid toward moveable element 18 to cause element 18 to expand or contract to set the desired height of the machine. If a lesser height is desired, valve 22 is selectively manipulated and consequently fluid is discharged to tank 26 causing a contraction of the moveable element.

Machine 10 is adapted with suspension control system 30 having a fluid reservoir or accumulator 32. Accumulator 32 is fluidly connected to suspension lock-out system 36 through conduit 34a and suspension lock-out system 36 is fluidly connected to moveable element 18 through conduit 34b. Suspension lock-out system 36 includes lock-out circuit 38 provided with flow blocking mechanism 40 which may be a two-position valve, for example. Lock-out circuit 38 is also provided with pilot operator 42, such as a solenoid valve, for example which is in a positioning relationship with flow blocking mechanism 40 as hereinafter described.

Flow blocking mechanism 40 includes pilot end 44, connected to pilot operator 42 and pilot operator 42 is hydraulically connected to accumulator 32 through bypass passageway 46b. Flow blocking mechanism 40 is provided with return end 48 hydraulically connected to accumulator 32 through passageway 50. Resilient member or spring 52 is attached to return end 48 of flow blocking mechanism 40 to urge the same into an unblocked position when pilot operator 42 is deactivated. Lock-out circuit 38 includes pilot passageway 54 extended between pilot operator 42 and a pressurized fluid supply 60. In an exemplary embodiment, pressurized fluid supply 60 may be an accumulator, for example, which derives pressurized fluid from moveable element 18 through a pressure regulated check valve 90.

Figure 2:
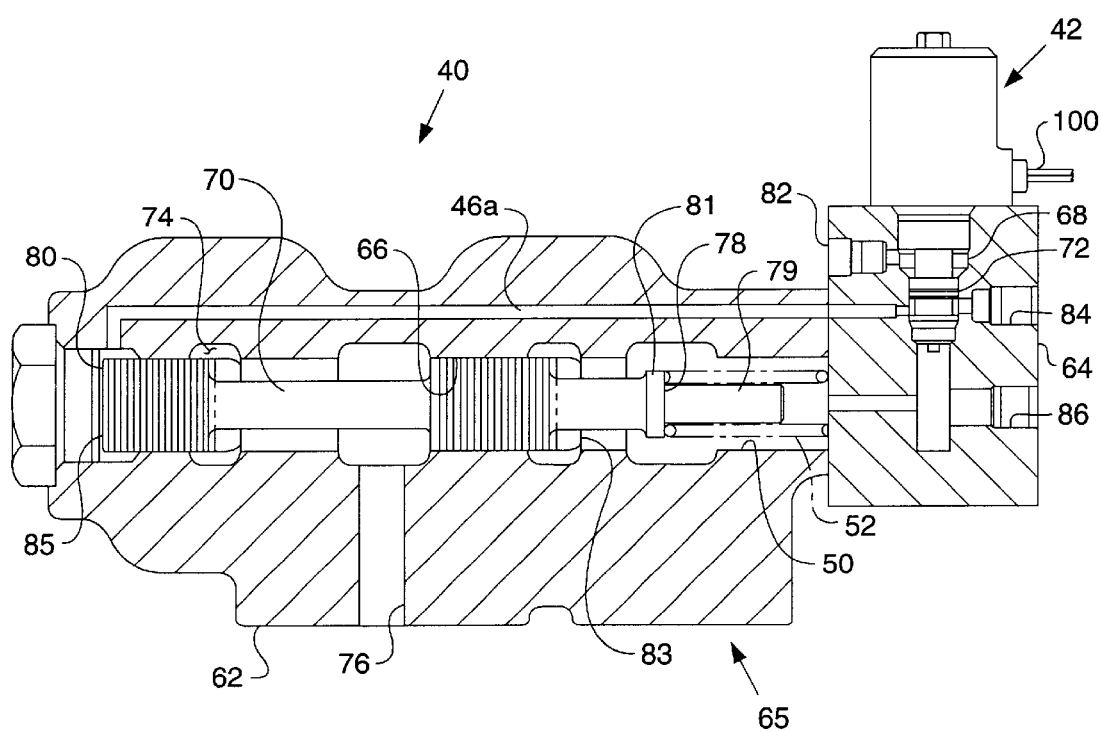
FIG. 2 is a sectional view of a flow blocking mechanism of the suspension control system of FIG. 1.

Referring to FIG. 2, flow blocking mechanism 40 includes housing 62 attached to solenoid housing 64, to form a unitary, integrated body 65. Housing 62 and solenoid housing 64 respectively include bores 66, 68 having valve elements or spools 70, 72 reciprocally disposed therein. Housing 62 includes accumulator port 74 and suspension cylinder port 76 which are hydraulically connected when valve element 70 is shifted away from solenoid housing 64, e.g., the spring biased "unlocked" position (as illustrated in FIG. 2).

Valve element 70 includes axial end 78, which is in contact with spring 52, and opposite axial end 80 which is exposed to a control pressure during activation of lock-out circuit 38. Spring 52 encircles guiding portion 79 of valve element 70 and is located between solenoid housing 64 and annular land portion 81 of valve element 70. Valve element ends 78, 80 accordingly provide effective areas 83, 85 which are exposed to fluid pressure from at least one of accumulator 32 or pressurized fluid supply 60, to cause movement of valve element 70, as hereinafter described. In the exemplary embodiment, effective areas 83, 85 are substantially identical.

Solenoid housing 64 of flow blocking mechanism 40 includes pressure control port 82 and a pair of ports 84, 86 which extend into bore 68 of solenoid housing 64. Accumulator 32 (FIG. 1) is in fluid communication with port 84 through bypass passageway 46b (FIG. 1) and port 86 through return passageway 50 (FIG. 1). Pressurized fluid supply 60 is in fluid communication with pressure control port 82 through pilot passageway 54 (FIG. 1). As best shown in FIG. 2, solenoid spool 72 includes a non-activated position (as illustrated in FIG. 2), which corresponds to hydraulic connection between accumulator 32 and axial ends 78, 80 of valve element 70 via ports 84 and 86. Solenoid spool 72 includes an activated position corresponding to a hydraulic connection between pressurized fluid supply 60 (FIG. 1) and axial end 80 of valve element 70 via control port 82 when the solenoid valve 42 is activated.

Activation of solenoid spool 72 allows pressurized fluid from supply 60 to communicate with end 80 of valve element 70 through port 82, in solenoid housing 64, and through bypass passageway 46a resulting in movement of valve element 70 towards pilot operator 42. When valve element 70 has shifted far enough toward pilot operator 42, accumulator port 74 is sealably blocked from suspension cylinder port 76, and consequently, accumulator 32 is fluidly disconnected from moveable element 18. Conversely, when the pilot operator is non-activated, solenoid spool 72 is biased to close pressure control port 82 such that pressurized fluid supply 60 is blocked from communication with valve element end 80, and consequently, moveable element 18 is in fluid communication with accumulator 32 as valve element 70 is spring-biased toward the non-activated position.

Referring again to FIG. 1, suspension lock-out system 36 includes pilot control system 88 having pressurized fluid supply 60 connected to pilot operator 42 through passageway 54 located in housing 62 (FIG. 2). Pressurized fluid supply 60 receives fluid from moveable element 18 through conduit 34b and one-way check valve 90. Check valve 90 is biased closed to ensure pressure within supply 60 is generally greater than the pressure accumulated within accumulator 32 such that pressurized fluid supply 60 serves as a high pressure fluid reservoir. Notably, pilot control system 88 includes minimal connections to preserve and sustain the high pressure signal within passageway 54 which may otherwise leak and render inoperable the suspension lock-out system.

Suspension control system 30 includes input device 98 such as a lock-out lever provided in a cab portion of machine 10, for example, and may be engaged by an operator when suspension lock-out is desired. Alternatively, other input devices known by those having ordinary skill in the art may be used. Further, as an alternative to input device 98 being manually controlled, it is envisioned that the pilot control system may be automatically or remotely controlled, for example.

Figure 3:
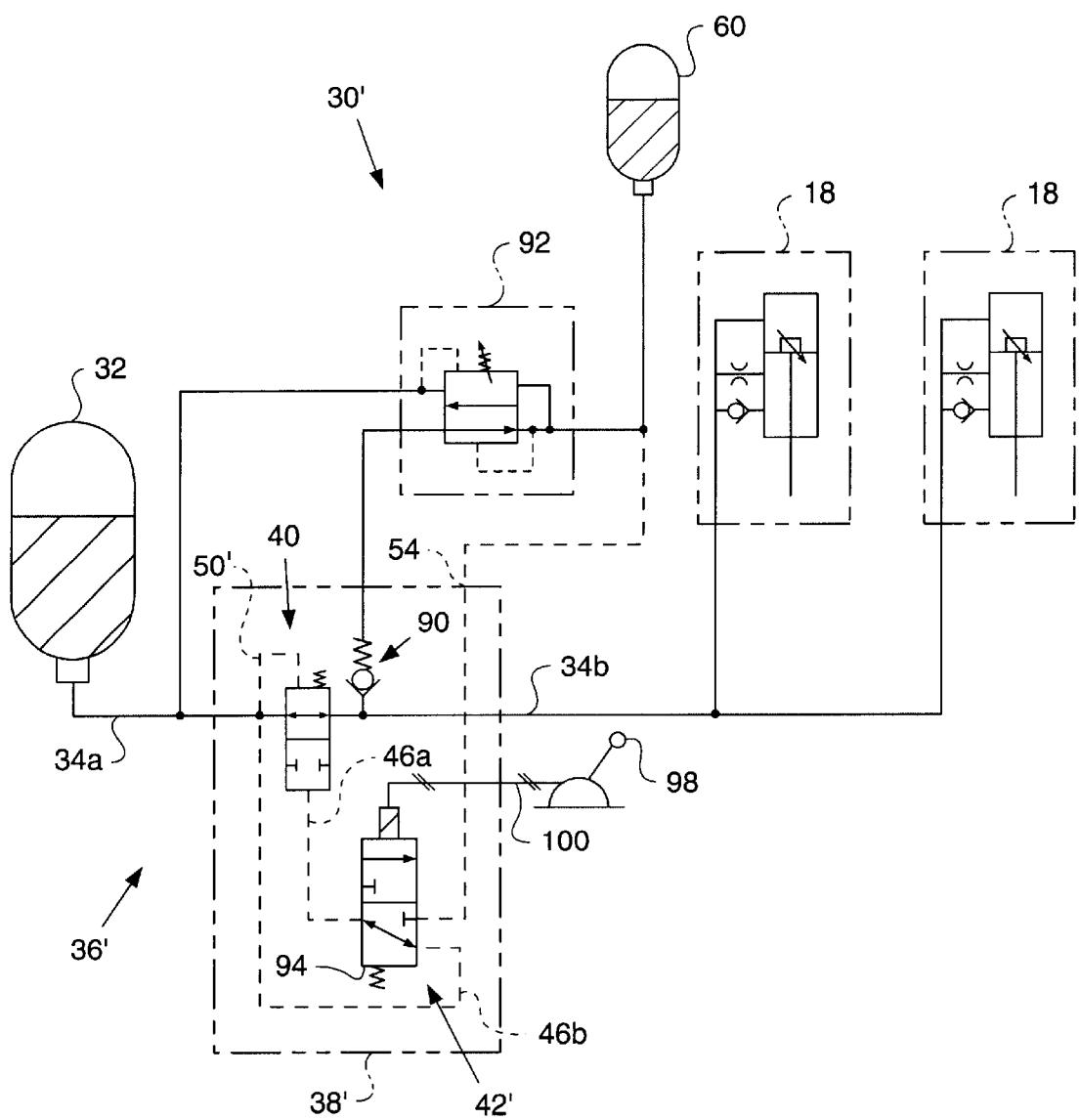
FIG. 3 is a schematic representation of a second embodiment of a suspension control system according to the present invention.

Referring to FIG. 3, a second embodiment of a suspension control system is shown and differs from suspension control system 30 (FIG. 1) in several aspects. One aspect may include a suspension control system 30' provided with a pressure relief valve arrangement 92 adapted to be variably adjusted through an external setting, for example, by an operator. One mode of operation of the relief valve arrangement 92 may include pressure within the pressurized fluid supply 60 being relieved or dumped to the accumulator 32 when the relief valve arrangement 92 is exposed to a predetermined, high pressure. By providing a relief valve between the pressurized fluid supply and the accumulator, overpressure fluid may be directed to the accumulator, rather than the tank so as to decrease the risk of system leakage. Moreover, since the accumulator 32 is significantly larger in volume than the pressurized fluid supply 60, overpressure fluid passed from the pressurized fluid supply to the accumulator is not likely to significantly influence pressure conditions within the accumulator.

Suspension control system 30' includes an additional moveable element 18 which may be associated with a second wheel (not shown) rotatably attached to the load support member 12 (FIG. 1). Suspension control system 30' also includes a suspension lock-out system 36' with a lock-out circuit 38' which differs from lock out circuit 38 of FIG. 1, by isolating return passageway 50' such that end 94 of the pilot operator 42' does not fluidly communicate with return passageway 50'.

INDUSTRIAL APPLICABILITY

In operation, pressurized fluid supply 60 is initially pressurized by having been stored from prior use or is quickly brought to pressure as the moveable element is displaced by an external influence (i.e., the wheel strikes a pot-hole or traverses uneven ground). In turn, a piston within the moveable element causes an amount of fluid to be pressurized. When it is desirable to lock the suspension control system, the operator manipulates the input device 98 causing an electrical signal to be either established or diminished through instrument line 100 to accordingly, activate lock-out circuit 38. As an alternative to employing an electrically activated pilot operator, pilot operator 42 may be hydraulically activated wherein activation of input device 98 causes activation of pilot operator 42 through instrument line 100', which may be a hydraulic conduit, for example.

Consequently, valve element 72 within pilot operator 42 is shifted away from the solenoid and pressurized fluid supply 60 is deployed to end 80 of valve element 70.

Referring to FIG. 2, as flow blocking mechanism 40 is urged toward an activated condition, corresponding to a suspension lock-out mode, the force on end 80 of valve element 70 exceeds the force acting on end 78 since the control pressure exceeds accumulator pressure. Consequently, the valve element 70 is shifted towards the solenoid valve 42 to compress spring 52. As a result, fluid communication between moveable member 18 (FIG. 1) and accumulator 32 (FIG. 1) is disconnected since valve element 70 sealably blocks accumulator port 74 from suspension cylinder port 76 and the suspension system is effectively "locked-out".

During normal operation of suspension control system 30, moveable element 18 is displaced in response to an external influence on base member 14 and fluid is directed to accumulator 32 to provide a cushioned ride for machine 10. As a result, machine 10 absorbs external influences such as impacts and the operator experiences a cushioned ride. When it is desirable to accurately position an implement attached to machine 10, the operator manipulates input device 98 which causes disabling of the cushioning effects provided by the suspension system.

For example, when positioning a cutting edge of a grading attachment during a digging or grading operation, the suspension system which normally responds to external influences, is locked-out to provide increased accuracy of operator placement of the implement. Notably, since suspension lock-out system 36 may be adapted directly between the moveable element and the accumulator, few additional parts are required and the potential for leakage is not significantly increased.

Suspension control system 30' operates similar to that of suspension control system 30 in accordance with operation of machine 10. However, the pressure relief valve arrangement 92 of suspension control system 30' provides protection for lock-out circuit 38' from an overpressure condition caused by an impact experienced by moveable element 18, for example. Since the relief valve arrangement 92 is positioned between the pilot passageway 54 and the moveable elements 18 the pilot passageway 54 is protected from an overpressure condition.

From the foregoing, it is readily apparent that the subject hydraulic suspension control systems 30, 30' provide a cushion ride arrangement for a machine and such suspension may be selectively disabled in the event precise and accurate control of an attachment is warranted.

Other aspects, objects and advantages of the invention can be obtained from a study of the drawings, the disclosure and the appended claims.

What is claimed is:

1. A suspension control system, comprising:
   a load support member;
   a base member;
   a moveable element attached to said base member and said load support member, said load support member being moveable relative to said base member through said moveable element;
   an accumulator in fluid communication with said moveable element;
   a fluid passage fluidly connected between said accumulator and said moveable element and configured and arranged to communicate fluid therebetween; and
   a locking circuit disposed between said moveable element and said accumulator and being selectively activatable to sustain said load support member in a fixed position, said locking circuit including:
      a pressurized fluid supply fluidly connected with said fluid passage and operable to receive said fluid from said fluid passage during operation of said suspension control system;
      a flow blocking mechanism operably engaged with said pressurized fluid supply;
      wherein said flow blocking mechanism is urged under the influence of said pressurized fluid supply to block fluid communication between said moveable element and said accumulator when said locking circuit is selectively activated.

2. The suspension control system of claim 1, wherein said pressurized fluid supply is an accumulator.

3. The suspension control system of claim 1, wherein substantially all hydraulic fluid disposed in said pressurized fluid supply is communicated to said pressurized fluid supply from said fluid passage.

4. The suspension control system of claim 3, further comprising a pressure regulator disposed between said pressurized fluid supply and said fluid passage.

5. The suspension control system of claim 1, wherein said flow blocking mechanism includes a valve including a valve element, said valve element includes a first pressure area and a second pressure area, said valve element is urged to move in response to one of said first and second pressure areas being exposed to a fluid pressure from said pressurized fluid supply when said locking circuit is selectively activated.

6. The suspension control system of claim 5, wherein fluid pressure from said accumulator is directed to said valve element and fluid pressure from said pressurized fluid supply is selectively directed to said valve element to urge movement of said valve element toward a flow blocking position.

7. The suspension control system of claim 1, wherein said flow blocking mechanism is fluidly connected between said accumulator and said pressurized fluid supply.

8. The suspension control system of claim 1, wherein said fluid is communicated to said pressurized fluid supply in response to movement of said moveable element.

9. The suspension control system of claim 1, further comprising a check valve disposed between said fluid passage and said pressurized fluid supply;
   wherein:
      said check valve is operable to allow fluid to pass from said fluid passage to said pressurized fluid supply; and
      said check valve is operable to oppose movement of said fluid from said pressurized fluid supply to said fluid passage.

10. A suspension control system, comprising:
    a load support member;
    a base member;
    a moveable element attached to said base member and said load support member, said load support member being moveable relative to said base member through said moveable element;
    an accumulator in fluid communication with said moveable element; and
    a locking circuit disposed between said moveable element and said accumulator and being selectively activatable to sustain said load support member in a fixed position, said locking circuit including:
       a pressurized fluid supply;

a flow blocking mechanism operably engaged with said pressurized fluid supply;

a pressure relief arrangement in fluid communication with said moveable element and said pressurized fluid supply;

wherein:

said flow blocking mechanism is urged under the influence of said pressurized fluid supply to block fluid communication between said moveable element and said accumulator when said locking circuit is selectively activated; and said pressure relief arrangement redirects fluid to said accumulator in response to an overpressure condition in said pressurized fluid supply.

11. A suspension control system, comprising:

a load support member;

a base member;

a moveable element attached to said base member and said load support member, said load support member being moveable relative to said base member through said moveable element;

an accumulator in fluid communication with said moveable element; and a locking circuit disposed between said moveable element and said accumulator and being selectively activatable to sustain said load support member in a fixed position, said locking circuit including:

a pressurized fluid supply;

a flow blocking mechanism operably engaged with said pressurized fluid supply, wherein:

said flow blocking mechanism is urged under the influence of said pressurized fluid supply to block fluid communication between said moveable element and said accumulator when said locking circuit is selectively activated;

said flow blocking mechanism includes a valve including a valve element, said valve element includes a first pressure area and a second pressure area, said valve element is urged to move in response to one of said first and second pressure areas being exposed to a fluid pressure from said pressurized fluid supply when said locking circuit is selectively activated; and said first and second pressure areas are simultaneously exposed to a fluid pressure from said accumulator when said locking circuit is in a non-activated condition and fluid communication between said moveable element and said accumulator is restored.

12. The suspension control system of claim 11, wherein when said locking circuit is in a non-activated condition said valve element is urged to return to a non-activated condition through a resilient member.

13. A method for stabilizing an implement of a machine, the machine being subject to an external influence, the method comprising the steps of:

accumulating pressurized fluid provided by a flow passage in response to the external influence exerted on the machine, the flow passage being fluidly connected between an accumulator and a moveable suspension member;

directing the pressurized fluid to a lock-out circuit disposed between the accumulator and the moveable suspension member; and causing the accumulator and the moveable member to be fluidly disconnected, wherein cushioning effects of the accumulator are disabled.

14. The method of claim 13, wherein the step of causing the accumulator and the moveable member to be fluidly disconnected includes activating a flow blocking mechanism by selectively moving an input device.

15. The method of claim 14, further comprising the step of restoring fluid communication between the moveable member and the accumulator by selectively de-activating the flow blocking mechanism.

16. The method of claim 14, wherein the input device is a control lever.

17. The method of claim 13, wherein the lock-out circuit is activated through an electrically activated control operator.

18. The method of claim 13, wherein the lock-out circuit is activated through a hydraulically activated control operator.

19. The method of claim 13, wherein the lock-out circuit is remotely activated.

20. A suspension control system, comprising:

a load support member;

a base member;

a moveable element attached to said base member and said load support member, said load support member being moveable relative to said base member through said moveable element;

an accumulator in fluid communication with said moveable element; and a locking circuit disposed between said moveable element and said accumulator and being selectively activatable to sustain said load support member in a fixed position, said locking circuit including:

a pressurized fluid supply;

a flow blocking mechanism operably engaged with said pressurized fluid supply; and a check valve fluidly connected between said moveable element and said pressurized fluid supply;

wherein:

said flow blocking mechanism is urged under the influence of said pressurized fluid supply to block fluid communication between said moveable element and said accumulator when said locking circuit is selectively activated; and said check valve is operable to (1) allow the passage of fluid from said movable element to said pressurized fluid supply and (2) oppose movement of said fluid from said pressurized fluid supply to said moveable element.

21. The suspension control system of claim 20, further comprising a pressure relief arrangement in fluid communication with said moveable element and said pressurized fluid supply, wherein said pressure relief arrangement redirects fluid to said accumulator in response to an overpressure condition in said pressurized fluid supply.

* * * * *